United States Patent

Sjostrom, Sr.

[15] 3,665,515
[45] May 30, 1972

[54] HANDLEBAR HAND PROTECTOR

[72] Inventor: John P. Sjostrom, Sr., Fox Lake, Ill.
[73] Assignee: Cass Industries, Ltd., McHenry, Ill.
[22] Filed: Nov. 24, 1969
[21] Appl. No.: 879,323

[52] U.S. Cl. ............................ 2/17, 296/78.1, 74/551.8
[51] Int. Cl. ............................................. A41d 13/08
[58] Field of Search ............ 2/17, 158, 170; 296/78.1; 74/551.8

[56] References Cited

UNITED STATES PATENTS

| 353,861 | 12/1886 | Hull | 2/17 |
| 2,089,086 | 8/1937 | Farkas | 2/17 |
| 3,203,005 | 8/1965 | Burrows | 2/158 |
| 3,397,891 | 8/1968 | Koch | 2/17 X |

FOREIGN PATENTS OR APPLICATIONS

| 1,115,042 | 12/1955 | France | 2/17 |
| 13,884 | 6/1904 | Great Britain | 2/17 |
| 955,041 | 4/1964 | Great Britain | 2/17 |

Primary Examiner—James R. Boler
Attorney—Alexander & Speckman

[57] ABSTRACT

A handlebar hand protector for use on snowmobiles, bicycles, motorcycles and other devices having similar handlebars, comprising two flexible sleeves each having a narrow end and a wide end, the narrow end having means for attachment to a handlebar running through an opening defined by the narrow end, and the wide end defining an opening allowing entry of a hand to grasp the handlebar within the sleeve.

10 Claims, 2 Drawing Figures

PATENTED MAY 30 1972

3,665,515

INVENTOR:
JOHN P. SJOSTROM, SR.
BY
Alexander Speckman
ATT'YS

HANDLEBAR HAND PROTECTOR

With the ever-increasing use during cold and snowy seasons of vehicles having handlebars of the type common on bicycles, there is an increasing need for protection of the hands of the driver from the elements of snow and cold while such vehicle is in operation. In particular, the advent and popularization of the snowmobile, a device used for transportation and recreation only during cold and snowy weather, have created an increased demand for protection of hands grasping handlebars.

Clothing, such as gloves and mittens, has proved to be an insufficient answer to the problem. Mittens restrict the use of hands and fingers and therefore reduce the capability of the operator to control the vehicle. Not only is it somewhat difficult to grasp the handlebars, but it is nearly impossible to regulate more intricate controls, such as gearshifts, brakes, horns and the like because movement of individual fingers is hampered. Gloves, on the other hand, while providing greater freedom of the hands and fingers, have failed in protection against the cold, particularly in windy conditions. Gloves, which provide greater hand protection by being tighter or of thinner material, do not protect the hands adequately. If the gloves are designed to give greater protection, freedom of hands and fingers is reduced. Furthermore, particularly when loose-cuffed coats are in use, cold air and snow will rush up the operator's sleeves, chilling his arms.

My invention overcomes the aforementioned problems. My invention provides a handlebar hand protector which substantially completely shelters the hand and wrist of the operator from cold wind and snow. The handlebar hand protector of this invention also prevents substantial passage of cold air up the operator's arms even though the operator is wearing a coat with loose wrist cuffs. It also provides a warm protector for the operator's hands while allowing free hand and finger movement. The operator may use fairly thin gloves, thus preserving freedom of hand and finger movement, since the major part of his protection from the elements is provided by the handlebar hand protector of this invention. This is accomplished because the handlebar hand protector diverts past the cuff the cold wind partially caused by movement of the vehicle.

Two sleeves each having a narrow end and a wide end are mounted on a handlebar. The narrow ends are secured tightly to the handlebar near the center of the handlebar. The operator inserts his hands in the wide ends to grasp the handlebar hand grips therein. A piece of material may be wrapped around the center area of a handlebar and around the narrow ends of the sleeves to cover the narrow end lacings or other fasteners to provide a finished appearance. This piece of material, designated as the wraparound, will also aid in preventing air from entering the narrow ends.

It is an object of this invention to provide a handlebar hand protector overcoming the aforementioned problems arising in prior methods of hand protection for operators of vehicles having handlebars.

It is another object of this invention to provide a handlebar hand protector allowing substantial freedom of hand and finger movement without substantial sacrifice of hand protection.

It is a further object of this invention to provide a handlebar hand protector which substantially prevents the passage of air through the arm cuff opening of the coat of the operator.

It is yet another object of this invention to provide a handlebar hand protector which improves protection of the hands of the operator from the elements, including wind created in part by movement of the vehicle.

These and other important objects will become apparent from the following description and from the drawings showing a preferred embodiment wherein.

Figure 1:
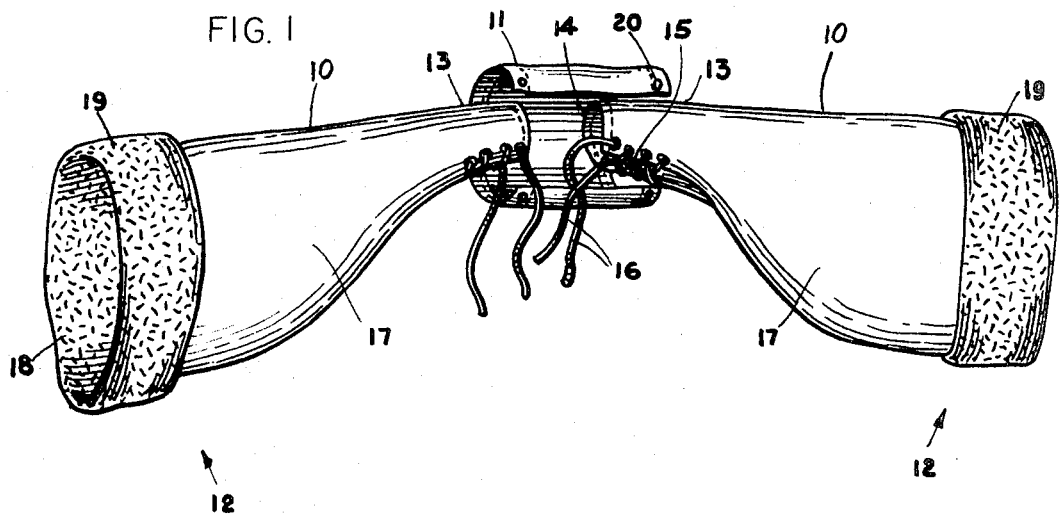
FIG. 1 is a perspective view, from the operator's side, of an unmounted handlebar hand protector of this invention.
Figure 2:
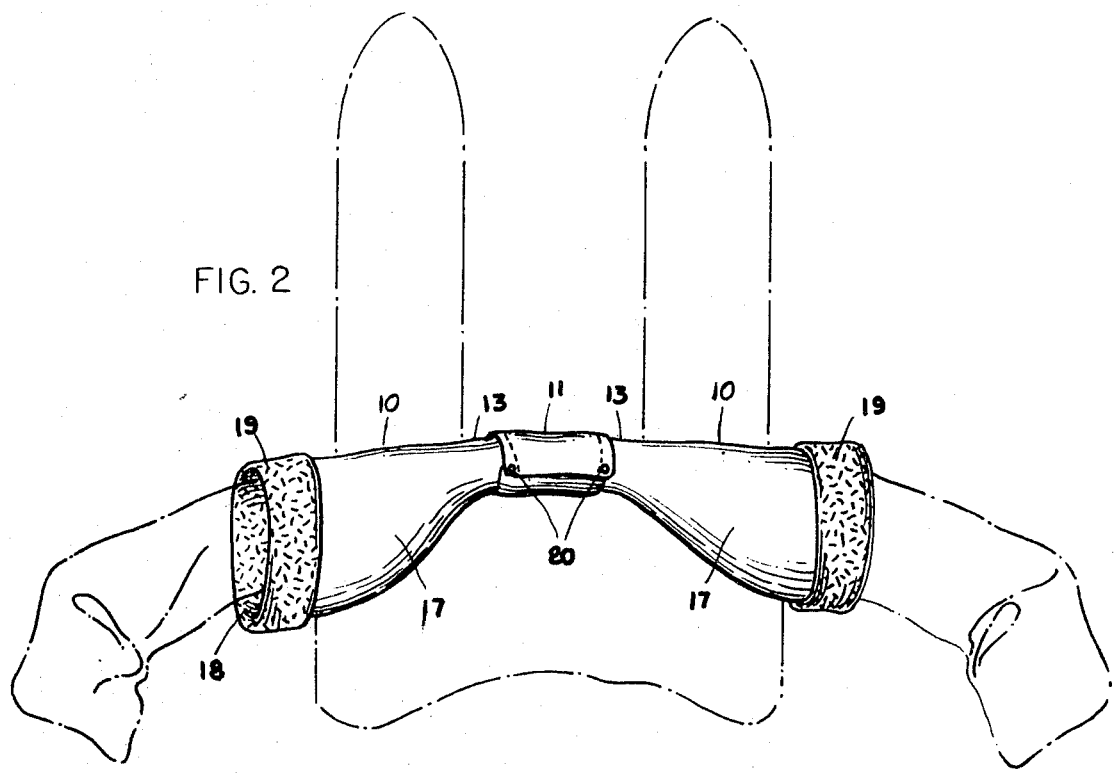
FIG. 2 is a top view of a handlebar hand protector of this invention, said handlebar hand protector being mounted on a vehicle handlebar.

Referring to FIGS. 1 and 2, a handlebar hand protector of this invention is shown having sleeves 10 and wraparound 11. Each sleeve is comprised generally of a wide end 12 and a narrow end 13. The wide end defines an opening which allows entrance of a hand to grasp the handlebar. Narrow end 13 defines another opening. The opening defined by narrow end 13 has a narrow end edge 14 which may be lengthened to include slit edges 15. If fastener 16 is loosened, lengthening narrow edge 14, the opening defined by narrow end 13 will thereby be enlarged. When the opening defined by narrow end 13 is thus enlarged, the sleeve may be moved such that one side of a handlebar is inserted through the opening defined by the narrow end 13 and the sleeve surrounds the handlebar. Narrow end edge 14 may be constructed to be expanded in other ways, such as by virtue of being elastic. It is required that narrow end edge 14 be expandable by some means unless specific accommodation has been provided to fasten narrow end 13 to a handlebar.

Fastener 16 may be tied tightly, causing narrow end 13 to firmly grasp the handlebar, normally near the middle of the handlebar. Thus, the sleeve will not be free to slide on the handlebar.

Two sleeves mounted on a handlebar, the narrow ends secured near the middle of the handlebar, will provide protection for both hands of the operator. The operator inserts his hands through the opening defined by wide end 12 and grasps the handlebar therein. Each sleeve will usually be approximately the length of the handlebar half within the sleeve. It is preferred that the handlebar grip be entirely covered in order that the operator's hands be inserted deep enough into each sleeve to gain desired protection. It is obvious that the sleeve may extend substantially past the handlebar grip without losing the benefits of the invention. The wide ends of the sleeves should allow insertion of the gloved hands and part of the clothed forearms of the operator. It is preferred that the wide ends be wide enough to allow easy insertion and hand freedom in operating the vehicle, but narrow enough to provide good protection and to avoid substantial flapping because of wind during operation.

An operator will normally wear a fairly tight-fitting glove which allows substantial freedom of movement of his hands and fingers. He can therefore operate brakes, shift, horn and other devices with substantial freedom. He will also have increased control of steering since he will have a firm grasp of the handlebar.

Each sleeve is constructed to provide protection from wind and the elements and warmth for the operator's hands. Thus, sleeve outside 17 is typically made of leather, plastic, vinyl or other similar natural or synthetic materials. Material of this nature is preferred because it provides wind resistance. Sleeve inside 18 is typically made of fur, wool, flannel, synthetic fur, pile or other fleecy material providing warmth for the operator's hands. The materials used for sleeve outside 17 and sleeve inside 18, and any other insulation layers that might be used, are flexible enough to allow mounting on handlebars of various shapes.

The wide end of each sleeve may be turned inside out to form border 19, which is of the same material as the material of sleeve inside 18.

Perforations in narrow end 13 adjacent to slit edges 15 may be used to facilitate tightening by fastener 16 of narrow end 13 around a handlebar. Perforations are not required, however. Fastener 16 may be attached to narrow end edge 14 for tightening narrow end 13 around a handlebar.

The fastener may be a leather lacing or leather strip. A buckle may be used. However, the greater flexibility of a leather lacing is preferred. Many types of fasteners would serve to tighten the sleeve to a handlebar. It is possible that the fastener be attached to a special eyelet or other device on a handlebar to prevent slippage. This may also be accomplished by attachment of the narrow end of one sleeve to the narrow end of the other.

After two sleeves are mounted on a handlebar in the method heretofore described, wraparound 11 may be wrapped around the center of the handlebars and the narrow ends 13 of both sleeves. The wraparound provides better appearance in a handlebar hand protector, and eliminates some air which may leak through the openings defined by narrow ends 13. The wraparound typically is made of the same flexible material used for sleeve outside 17. Other materials, however, may be used. The wraparound 11 has connectors 20 to allow fastening of said wraparound to itself. Typically, connectors 20 are snaps of the kinds used on women's wallets. Other types of connectors may be used. Strings, straps, buckles and stick tape are examples. The wraparound typically is of a generally rectangular shape. However, any shape which will allow proper covering of the middle of the handlebar and the narrow ends of the sleeves is suitable. The wraparound may be notched or of other irregular shape to accommodate handlebar stems of certain vehicles. The wraparound, instead of being fastened to itself, may be fastened to the sleeves.

The handlebar hand protector of this invention has great utility when used with snowmobiles, motorcycles, bicycles and other vehicles having similar handlebars. The protection of hands and arms which it affords will allow greater comfort and therefore increased participation in such activities.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In combination with a vehicle handlebar of the type having a center portion and two hand grips at the extremities thereof, a handlebar hand protector mounted thereon comprising: two flexibile sleeves, each having a narrow end with a narrow end edge, and an opposite wide end, and having an inside surface and an outside surface, said ends defining openings at either end of each of said sleeves, said sleeves each encompassing substantially half of said vehicle handlebar, said narrow ends of each of said sleeves connected to said center portion of said handlebar and said wide ends being about said hand grips respectively, each of said sleeves being of sufficient diameter for a substantial distance along said handlebar from said wide end to allow ready access to said hand grips and to portions of the handlebar intermediate of said grips and said center portion.

2. The handlebar hand protector of claim 1 wherein said narrow end edge is comprised of slit edges.

3. The handlebar hand protector of claim 1 wherein said narrow end edges of said sleeves are expandable to enlarge said narrow ends.

4. The handlebar hand protector of claim 3 wherein said outside surface comprises a wind resistant material.

5. The handlebar hand protector of claim 3 wherein said inside surface comprises a fleecy material.

6. The handlebar hand protector of claim 3 wherein said narrow ends of said sleeves are covered by a wraparound.

7. The handlebar hand protector of claim 6 wherein said outside surface comprises a wind resistant material.

8. The handlebar hand protector of claim 6 wherein said inside surface comprises a fleecy material.

9. The handlebar hand protector of claim 8 wherein said narrow end edge is comprised of slit edges.

10. The handlebar hand protector of claim 9 wherein said outside surface comprises a wind resistant material.

* * * * *